United States Patent Office 3,442,956
Patented May 6, 1969

3,442,956
PREPARATION OF 4,4'-DINITRODIPHENYL ETHER
Thomas M. Sheets, Newark, Del., assignor to E. I. du Pont de Nemours and Company, Wilmington, Del., a corporation of Delaware
No Drawing. Filed Dec. 8, 1967, Ser. No. 688,995
Int. Cl. C07c 41/00, 41/04
U.S. Cl. 260—612    5 Claims

ABSTRACT OF THE DISCLOSURE

An improvement in the process for preparing 4,4'-dinitrodiphenyl ether by condensing p-chlorinitrobenzene with a p-nitrophenol alkali metal salt in dimethylacetamide as solvent, which comprises conducting the reaction below reflux temperature, using lower specified amounts of dimethylacetamide and recovering dimethylacetamide directly from the reaction mixture by vacuum distillation.

Background

It is known to prepare 4,4'-dinitrodiphenyl ether by the condensation of p-chloronitrobenzene with a p-nitrophenol alkali metal salt in a solvent such as dimethylacetamide, as described by Spiegler in U.S. Patent No. 3,192,263. Spiegler conducted the condensation at the reflux temperature of the reaction mass (reportedly about 175°–180° C.), using an amount of solvent about equal in weight to the sum of the initial reactants, i.e. generally an amount equal in weight to from 1.5 to 2.5 times the weight of the chloronitrobenzene.

When this process is operated under these conditions on a large plant scale, small amounts of impurities are formed together with the 4,4'-dinitrodiphenyl ether, which are difficult to remove. The 4,4'-dinitrodiphenyl ether is hydrogenated to 4,4'-diaminodiphenyl ether which in turn is used as a monomer starting material for a high molecular weight polymer. The aforementioned impurities if carried over into the final polymer cause a change in properties, rendering the polymer unsatisfactory for some uses, such as the preparation of films. Not only are these impurities difficult to remove from the dinitrodiphenyl ether, but more important, they are difficult to detect at this stage and become apparent only in the final polymer. In fact, the presence of only a fraction of a percent impurity, causes undesired cross-linking to occur in the polymer. Therefore, after each manufacture, it has been necessary to hydrogenate a test portion of the 4,4'-dinitrodiphenyl ether and convert to the polymer to determine whether the entire yield of dinitrodiphenyl ether is satisfactory for conversion to film grade polymer. This procedure is cumbersome as well as wasteful and uneconomical. If unsatisfactory, the dinitrodiphenyl ether must be disposed of in some way.

It has now been found unexpectedly that certain critical conditions exist, which if observed, lead to the consistent manufacture of consistently high-yield, impurity-free dinitrodiphenyl ether.

It is therefore an object of this invention to provide a process for the manufacture of 4,4'-dinitrodiphenyl ether which is consistently free of impurities. It is a further object to provide such a process wherein the solvent is recovered economically and in a pure state.

Brief summary of the invention

These and other objectives are accomplished according to the present invention by, in a process for preparing 4,4'-dinitrodiphenyl ether by condensation of p-chloronitrobenzene with a p-nitrophenol alkali metal salt in dimethylacetamide as solvent for the reaction mixture, the improvement which comprises heating the reaction mixture at 155°–170° C., using about 0.70 to 1.4 parts by weight of said dimethylacetamide per part of said p-chloronitrobenzene and recovering dimethylacetamide directly from the reaction mixture by vacuum distillation.

The above improvement is also obtained by heating at reflux under vacuum.

Detailed description of invention

As described in U.S. Patent No. 3,192,263, an alkali metal salt of p-nitrophenol and p-chloronitrobenzene are heated in dimethylacetamide to effect condensation and formation of 4,4'-dinitrodiphenyl ether.

The alkali-metal is preferably sodium or potassium. Lithium is also suitable, but more expensive.

The alkali-metal phenolates are generally prepared by hydrolyzing with strong alkali the corresponding chlorine derivatives. Some of them, however, are explosive hazards in the dry state. It is therefore advantageous, instead of employing a dry nitrophenolate, to start with an aqueous press cake of the same. In such event, the reaction mixture containing the solvent, nitrophenolate and chloronitrobenzene is first dehydrated by distilling off the water, and is then heated to the desired higher temperature, to complete the condensation. Preferably, the nitrophenolate and dimethylacetamide solvent are heated to distill the water and then the p-chloronitrobenzene is added.

Moreover, instead of starting with a nitrophenolate, the nitrophenol may be used in the form of the free hydroxy compound. In this case, stoichiometric amounts of sodium or potassium hydroxide or an excess of an alkali metal carbonate is added to the reaction mass prior to the dehydration distillation, to form the alkali-metal phenolate in situ. Other conventional acid binders, including sodium or potassium bicarbonates or disodium phosphate, may be employed in place of the alkali carbonate.

After the addition of p-chloronitrobenzene, the temperature of the reaction mixture is raised to 155° to 170° C., preferably 165°–170° C., which is below the reflux temperature of the reaction mixture (about 185°–190° C. or higher, depending on the concentration of reactants, etc.) in a reaction vessel equipped with means for agitation, heating, cooling and vacuum.

The reaction is carried out at atmospheric pressure, maintaining the reaction mixture at 155°–170° C. for from 1 to about 6 hours, preferably 2 to 4 hours, depending on the temperature, concentration of reactants, etc.

Vacuum is then applied and dimethylacetamide is distilled at about 100–400 mm. Hg (millimeters mercury pressure), preferably about 150–350 mm. Hg.

As an operating convenience and means for improving temperature control, the entire heating cycle is preferably run under vacuum, at about 150–400 mm. Hg and at the reflux temperature (about 155–170° C., depending on the degree of vacuum). A slightly higher pressure, up to about 550 mm. Hg, may be employed near the end of the reaction period if desired to maintain a slight reflux.

After the dimethylacetamide is distilled, the charge is usually cooled to about 125° C., drowned in water at about 60°–70° C. and held for about an hour at 95°–100° C., filtered and washed to consistently obtain highly pure 4,4'-dinitrodiphenyl ether.

In addition to the lower reaction temperature, a critical feature of this invention is the surprising fact that a smaller amount of solvent than that previously used in the art has a beneficial effect on quality of product. In general, about 0.4–0.75 times by weight of solvent of the weight of both reactants or about 0.70–1.4 times by weight of solvent of the p-chloronitrobenzene is used. About 0.8–0.9 part by weight of dimethylacetamide per part of p-chloronitrobenzene is preferred.

It has been the practice to isolate the 4,4'-dinitrodiphenyl ether by drowning the entire reaction mass in water and filtering to recover the product which was washed to remove sodium chloride. The aqueous filtrate from the drowning step could then be subjected to fractional distillation to recover N,N-dimethylacetamide for re-use. Such recovery of solvent is not economical since some solvent is always lost. Furthermore, as the water is distilled, the solvent becomes contaminated with salts.

Now it has been found that if toward the end of the reaction, the solvent is removed by vacuum distillation directly from the reaction mass, the solvent is substantially completely recovered in a pure state suitable for re-use. Another advantage is that the time necessary to maintain the reactants at the reaction temperature is shortened, since the reaction is carried to completion as the solvent is distilled.

By the process of the prior art, a consistently pure product could not be obtained on a plant scale. The freezing point (apparent) varied widely from 137° to 144° C. Now, according to the process of this invention, the variation in freezing point (apparent) is small, e.g., about 143.4° to 143.9° C. In addition, the maximum yield of dinitrodiphenyl ether increased from about 84% to about 96% or more in commercial manufacture.

The following examples illustrate the process of the invention.

EXAMPLE 1 (Ratio of DMAC/PCNB=0.92)

A one liter glass flask equipped with heating mantle, thermometer, vacuum, condenser, and agitator was charged with 295 g. dimethylacetamide and 333 g. p-nitrophenol Na salt as 77% Active Ingredient (A.I.) [i.e., 434 g. of wet cake was charged containing about 23% water (101 g.) and 77% (333 gms.) of the salt]. The pressure was lowered to 385 mm. Hg and heat applied to distill the water. Reflux was allowed to take place taking off 117 g. distillate until the pot temperature reached 152° C. and the vapor temperature was 107° C. Vacuum was released with $N_2$ and 321 g. molten p-chloronitrobenzene added over a 20 min. period while flask temperature was adjusted to 153°–155° C. The temperature was increased to 165°–172° C. and held for 4.5 hours. The pressure was then lowered to 150 mm. Hg dimethylacetamide was distilled without reflux while flask temperature decreased to 138° C. and gradually increased to 165° C. at the end of the distillation. 204 grams of dimethylacetamide were recovered. Vacuum was released with $N_2$, the mass cooled to 135° C. and poured into 2 liters of hot water, held for 1 hour at 95° C. filtered, washed and dried. Yield of 4,4'-dinitrodiphenyl ether was 478 g. (90.2% of theory) having an apparent freezing point of 143.4° C.

EXAMPLE 2 (Ratio of DMAC/PCNB=1.25)

Into the same equipment as used in Example 1, was charged 358 g. dimethylacetamide and 391 g. wet p-nitrophenol Na salt (containing 77% A.I.). Vacuum was applied and 160 g. water plus dimethylacetamide were distilled as overhead, using 275 mm. Hg pressure and refluxing to minimize dimethylacetamide in distillate. At the end of the dewatering step the flask temperature was 170° C. and vapor temperature was 128° C. With the flask still under vacuum, 286 g. p-nitrochlorobenzene plus 69 g. dimethylacetamide were added (to make up for solvent removed during dewatering) over a 30-minute period. The flask temperature was held on 170°–173° C. for 5 hours while pressure was adjusted to maintain a slight reflux, which varied from 470 mm. Hg to 530 mm. Hg at the end of the hold period. After 5 hours on temperature the pressure was lowered and dimethylacetamide was recovered by distilling over without reflux. When 274 gms. of solvent had been recovered the flask temperature was 169° C. and pressure was 290 mm. Hg. Vacuum was released with $N_2$, charge was cooled to 125° C. and poured into 2 liters $H_2O$. The slurry was heated to 95° C. and agitated one hour before filtering, washing and drying. The amount of 4,4'-dinitrodiphenyl ether recovered was 458 g. (97% of theory). Color was light yellow and apparent freezing point was 143.7° C.

EXAMPLE 3 (Plant charge)

Into a 1,000 gallon, glass-lined vessel equipped with agitation, means for vacuum, heating, cooling and a thermometer well are charged 2460 lbs. dimethylacetamide and 2772 lbs. p-nitrophenol Na salt (1.5% excess) as 77% A.I. (i.e., 3600 lbs. of wet cake). The vessel was closed and vacuum applied to a pressure of 330 mm. Hg. Heat was applied and at 135° C. vapor temperature the water contained originally in the p-nitrophenol Na salt was distilled off. The heating was continued and at a pot temperature of 165–170° C., 2675 lbs. p-chloronitrobenzene were added over a period of 1.5 hours. The mixture was maintained at reflux at a pressure of 330 mm. Hg for 3 hours, after which the dimethylacetamide was distilled off under the vacuum. At the end of the distillation, the temperature rose sharply to 190° C. in the kettle. The vacuum was released and the reaction mixture cooled to 125° C. The mass was drowned in 1000 gallons water at 50° C., agitated for one hour at 90°, filtered and product washed free of salt. 4345 pounds (98.5% of theory) of dry 4,4'-dinitrodiphenyl ether of apparent freezing pt. of 143.4° C. were obtained.

Thus by the combination of reaction conditions, as shown, such a lower reaction temperature, relatively small amount of solvent and vacuum distillation of dimethylacetamode from the reaction mixture, substantially pure 4,4'-dinitrodiphenyl ether can be consistently obtained. By using these conditions, the process can be operated advantageously on a large scale.

Since various embodiments of the subject invention may be employed without departing from the spirit or scope thereof, it is to be understood that the subject invention is not limited to the specific illustrations shown and described.

What is claimed is:

1. In a process for preparing 4,4'-dinitrophenyl ether by condensation of p-chloronitrobenzene with a p-nitrophenol alkali metal salt in dimethylacetamide as solvent for the reaction mixture, the improvement which comprises:
    (a) heating said reaction mixture at 155° to 170° C. for from about 1 to 6 hours, using about 0.7 to about 1.4 parts by weight of said dimethylacetamide per part of said p-chloronitrobenzene; and
    (b) recovering said dimethylacetamide directly from the reaction mixture, before recovery of the resultant 4,4'-dinitrodiphenyl ether, by vacuum distillation at from about 100 to 400 millimeters mercury pressure.

2. Claim 1 wherein said heating step is carried out at 165° to 170° C. for 2 to 4 hours using from about 0.8 to about 0.9 parts of said dimethylacetamide.

3. Claim 1 wherein said heating step is carried out at reflux under from about 150 to about 400 millimeters mercury pressure.

4. Claim 3 wherein said heating step is for a period of 2 to 4 hours using about 0.8 to 0.9 part of said dimethylacetamide.

5. Claim 4 wherein both the heating and recovery steps are carried out at about 150 to 400 mm. Hg.

References Cited

UNITED STATES PATENTS

| | | | |
|---|---|---|---|
| 3,032,594 | 5/1962 | Towle | 260—612 |
| 3,192,263 | 6/1965 | Spiegler | 260—612 XR |
| 3,387,041 | 6/1968 | Oscar | 260—612 |

BERNARD HELFIN, *Primary Examiner.*

U.S. Cl. X.R.

260—571